US007120625B2

(12) United States Patent
Kagimasa et al.

(10) Patent No.: US 7,120,625 B2
(45) Date of Patent: Oct. 10, 2006

(54) METHOD AND APPARATUS FOR DOCUMENT INFORMATION MANAGEMENT

(75) Inventors: Hideko Kagimasa, Yokohama (JP); Toru Takahashi, Kamakura (JP); Mikihiko Tokunaga, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 424 days.

(21) Appl. No.: 10/147,066

(22) Filed: May 17, 2002

(65) Prior Publication Data

US 2003/0093417 A1    May 15, 2003

(30) Foreign Application Priority Data

Nov. 15, 2001    (JP)    ............................. 2001-349689

(51) Int. Cl.
*G06F 17/30* (2006.01)
*G06F 7/00* (2006.01)

(52) U.S. Cl. ............................. 707/3; 707/6; 707/203

(58) Field of Classification Search ................ 707/1–6, 707/9, 10–104.1, 200, 103 R, 203; 709/201, 709/203, 206, 218, 217, 227; 715/515, 522, 715/500.1, 513

See application file for complete search history.

(56) References Cited

U.S. PATENT DOCUMENTS

| 5,142,678 | A | * | 8/1992 | MacPhail ..................... 715/500 |
| 5,280,609 | A | * | 1/1994 | MacPhail ........................ 707/1 |
| 5,517,622 | A | * | 5/1996 | Ivanoff et al. .............. 709/232 |
| 5,649,192 | A | * | 7/1997 | Stucky .................... 707/103 R |
| 5,671,428 | A | * | 9/1997 | Muranaga et al. .......... 715/751 |
| 5,815,704 | A | * | 9/1998 | Shimotsuji et al. .......... 707/100 |
| 5,870,745 | A | * | 2/1999 | McCune ....................... 707/10 |
| 5,893,114 | A | * | 4/1999 | Hashimoto et al. ......... 707/200 |
| 5,905,862 | A | * | 5/1999 | Hoekstra ..................... 709/202 |
| 5,999,978 | A | * | 12/1999 | Angal et al. ................ 709/229 |
| 6,009,442 | A | * | 12/1999 | Chen et al. .................. 715/522 |
| 6,229,922 | B1 | * | 5/2001 | Sasakawa et al. .......... 382/209 |
| 6,237,011 | B1 | * | 5/2001 | Ferguson et al. ........... 715/515 |
| 6,473,754 | B1 | * | 10/2002 | Matsubayashi et al. ........ 707/5 |
| 6,487,599 | B1 | * | 11/2002 | Smith et al. ................ 709/229 |

(Continued)

FOREIGN PATENT DOCUMENTS

JP    5-174060    7/1993

(Continued)

*Primary Examiner*—Jacques Veillard
(74) *Attorney, Agent, or Firm*—Mattingly, Stanger, Malur & Brundidge, P.C.

(57) ABSTRACT

A document information management method includes the steps to be executed by: a document registration program of storing a document in a document storage unit in accordance with a registered document by a user, document properties and a user profile, and forming document query and query structure indices of document properties and the user profile to store these indices in a query data storage unit and to further form several seeds documents; a related document retrieval program of retrieving a query data storage unit by using the seeds documents as query expressions to obtain query results of the document, the document properties and the user profile; and a related information notification program of generating related information of the document for each of the query results, and notifying the related information for each notice destination, including the related information of the document, of the document properties and of the user profile.

9 Claims, 16 Drawing Sheets

U.S. PATENT DOCUMENTS

| | | | |
|---|---|---|---|
| 6,549,898 B1 * | 4/2003 | Inaba et al. | 707/5 |
| 6,553,368 B1 * | 4/2003 | Martin et al. | 707/3 |
| 6,594,665 B1 * | 7/2003 | Sowa et al. | 707/10 |
| 6,665,667 B1 * | 12/2003 | Inaba et al. | 707/5 |
| 6,772,229 B1 * | 8/2004 | Achacoso et al. | 710/4 |
| 2002/0016972 A1 * | 2/2002 | Ogawa et al. | 725/133 |

FOREIGN PATENT DOCUMENTS

| | | |
|---|---|---|
| JP | 9-311805 | 12/1997 |
| JP | 11-136276 | 5/1999 |
| JP | 2000-89991 | 3/2000 |
| JP | 2001-14326 | 1/2001 |

* cited by examiner

FIG. 4

| USER ID | ORGANIZATION | WORK UNDER CHARGE | MAIL ADDRESS |
|---|---|---|---|
| a | FINANCE 3G | BANK MARKETING | user_a@xxx.co.jp |
| b | INSURANCE 2G | LIFE INSURANCE MARKETING | user_b@xxx.co.jp |
| c | INSURANCE 1G | INSURANCE MARKETING | user_c@xxx.co.jp |
| d | FINANCE 2G | FINANCE SE | user_d@xxx.co.jp |
| e | INSURANCE 3G | FIRE INSURANCE SE | user_e@xxx.co.jp |
| f | FINANCE 1G | FINANCE MARKETING | user_f@xxx.co.jp |
| g | ePJ | MARKETING, PLANNING | user_g@xxx.co.jp |
| ... | | | |
| m | FINANCE 1G,ePJ | FINANCE MARKETING | user_m@xxx.co.jp |
| ... | | | |

FIG. 5

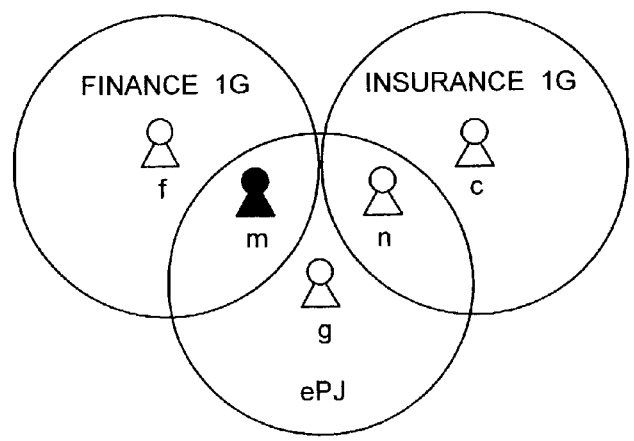

FIG. 7

RELATED INFORMATION

📄 DOCUMENT HAVING SIMILAR CONTENTS WAS REGISTERED

REGISTERED DOCUMENT
REGISTRANT : USER m
DOCUMENT ID : 89
DOCUMENT NAME : DB PROPOSAL

REGISTRANT USER PROFILE
ORGANIZATION : FINANCE 1G, EPJ
WORK UNDER CHARGE : FINANCIAL MARKETING
MAIL ADDRESS : user_m@xxx.co.jp

YOUR DOCUMENT
DOCUMENT ID : 67
DOCUMENT NAME : INTEGRATED SYSTEM

SIMILARITY : 95

———— ★★★ NOTICE OF RELATED INFORMATION ★★★ ————
OF REGISTERED DOCUMENT

📄 REFER TO USER PROFILE BY CLICKING REGISTRANT

| SIMILARITY | DOCUMENT ID | DOCUMENT NAME | CUSTOMER NAME | BUSINESS TYPE | REGISTRANT | POSITION | REGISTRATION DATE |
|---|---|---|---|---|---|---|---|
| 100 | 89 | DB PROPOSAL | M BANK | FINANCE | USER m | FINANCE 1G | 20001225 |
| 95 | 67 | INTEGRATED SYSTEM | A BANK | FINANCE | USER a | FINANCE 3G | 20001115 |
| 87 | 23 | NEXT DB PROPOSAL PAPER | B INSURANCE | INSURANCE | USER b | INSURANCE 2G | 20001003 |
| 83 | 12 | NEW SERVICE | C COMPANY | INSURANCE | USER c | INSURANCE 1G | 20001001 |

FIG. 8

DISPLAY OF RECEIVED MAIL

[RETURN] [TRANSFER]

SUBJECT : [ALERT : A006] NOTICE OF SIMILAR DOCUMENT REGISTRATION

DATE : 2000/12/25

FROM : km_alert@xxx.co.jp

TO : user_d@xxx.co.jp

APPENDED FILE :
🗎 RELATED INFORMATION.htm ~ 8010

★ DOCUMENT HAVING SIMILAR DOCUMENT PROPERTIES WAS REGISTERED
CONFIRM BY CLICKING APPENDED RELATED INFORMATION.htm REGISTERED DOCUMENT
REGISTRANT : USER m
DOCUMENT ID : 89
DOCUMENT NAME : DB PROPOSAL REGISTRANT USER PROFILE
ORGANIZATION : FINANCE 1G, EPJ
WORK UNDER CHARGE : FINANCIAL MARKETING
MAIL ADDRESS : user_m@xxx.co.jp

YOUR DOCUMENT
DOCUMENT ID : 45
DOCUMENT NAME : DB INTEGRATION PROPOSAL

SIMILARITY : 65

END

FIG. 9

RELATED INFORMATION

📄 DOCUMENT HAVING SIMILAR CONTENTS WAS REGISTERED

REGISTERED DOCUMENT
REGISTRANT : USER M
DOCUMENT ID : 89
DOCUMENT NAME : DB PROPOSAL

REGISTRANT USER PROFILE
ORGANIZATION : FINANCE 1G, EPJ
WORK UNDER CHARGE : FINANCIAL MARKETING
MAIL ADDRESS : user_m@xxx.co.jp

YOUR DOCUMENT 📄
DOCUMENT ID : 45
DOCUMENT NAME : DB INTEGRATING PROPOSAL

SIMILARITY : 65

━━━ ★★★ NOTICE OF RELATED INFORMATION ★★★ ━━━
OF REGISTERED DOCUMENT

REFER TO USER PROFILE BY CLICKING REGISTRANT                                              3110

| SIMILARITY | DOCUMENT ID | DOCUMENT NAME | CUSTOMER NAME | BUSINESS TYPE | REGISTRANT | POSITION | REGISTRATION DATE |
|---|---|---|---|---|---|---|---|
| 100 | 89 | DB PROPOSAL | M BANK | FINANCE | USER m | FINANCE 1G | 20001225 |
| 65 | 45 | DB INTEGRATING PROPOSAL | A BANK | FINANCE | USER a | FINANCE 2G | 20001028 |
| 43 | 23 | NEXT DB PROPOSAL PAPER | B INSURANCE | INSURANCE | USER b | INSURANCE 2G | 20001003 |
| 30 | 56 | NEW DB SERVICE | E INSURANCE | INSURANCE | USER e | INSURANCE 3G | 20001105 |

RELATED INFORMATION

📄 DOCUMENT HAVING SIMILAR CONTENTS WAS REGISTERED

REGISTERED DOCUMENT
REGISTRANT : USER m
DOCUMENT ID : 89
DOCUMENT NAME : DB PROPOSAL

REGISTRANT USER PROFILE
ORGANIZATION : FINANCE 1G, EPJ
WORK UNDER CHARGE : FINANCIAL MARKETING
MAIL ADDRESS : user_m@xxx.co.jp

YOUR DOCUMENT 👤
DOCUMENT ID : 78
DOCUMENT NAME : DB INTEGRATING PROPOSAL

SIMILARITY : 70

─── ★★★ NOTICE OF RELATED INFORMATION ★★★ ─── 3120
OF REGISTERED DOCUMENT

REFER TO USER PROFILE BY CLICKING REGISTRANT

| SIMILARITY | DOCUMENT ID | DOCUMENT NAME | REGISTRANT | ORGANIZATION | WORK UNDER CHARGE | MAIL ADDRESS |
|---|---|---|---|---|---|---|
| 100 | 89 | DB PROPOSAL | USER m | FINANCE 1G, ePJ | FINANCIAL MARKETING | user_m@xxx.co.jp |
| 70 | 78 | DOCUMENT MANAGEMENT SYSTEM | USER f | FINANCE 1G | FINANCIAL MARKETING | user_f@xxx.co.jp |
| 62 | 34 | NEW PLANING | USER g | ePJ | MARKETING, PLANNING | user_g@xxx.co.jp |
| 40 | 45 | DB INTEGRATING PROPOSAL | USER d | FINANCE 2G | FINANCIAL SE | user_d@xxx.co.jp |

3121

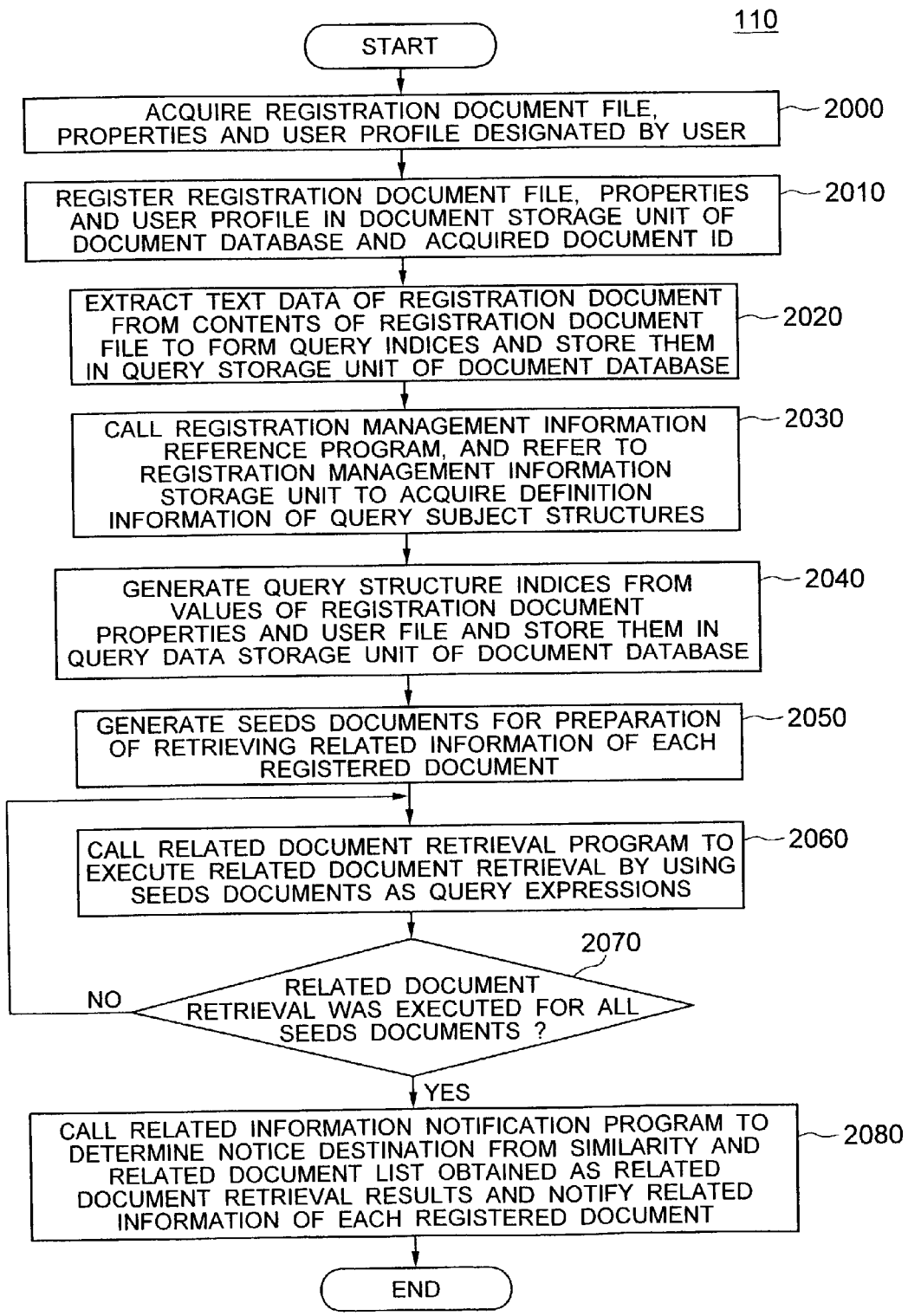

FIG. 14

RELATED INFORMATION

📄 DOCUMENT HAVING SIMILAR CONTENTS WAS REGISTERED

REGISTERED DOCUMENT
REGISTRANT : USER m
DOCUMENT ID : 89
DOCUMENT NAME : DB PROPOSAL

REGISTRANT USER PROFILE
ORGANIZATION : FINANCE 1G, EPJ
WORK UNDER CHARGE : FINANCIAL MARKETING
MAIL ADDRESS : user_m@xxx.co.jp

YOUR DOCUMENT
DOCUMENT ID : 67
DOCUMENT NAME : INTEGRATED SYSTEM

SIMILARITY : 95

★★★ NOTICE OF RELATED INFORMATION ★★★
OF REGISTERED DOCUMENT

— 3300

[★] REGISTRATION FOLDER : BUSINESS [ ] OTHER FOLDERS
TYPE/FINANCE/BANK

REFER TO USER PROFILE BY CLICKING REGISTRANT

— 3100

| SIMILARITY | DOCUMENT ID | DOCUMENT NAME | CUSTOMER NAME | BUSINESS TYPE | REGISTRANT | POSITION | REGISTRATION DATE | FOLDER |
|---|---|---|---|---|---|---|---|---|
| 100 | 89 | DB PROPOSAL | M BANK | FINANCE | USER m | FINANCE 1G | 20001225 | ★ 3310 |
| 95 | 67 | INTEGRATED SYSTEM | A BANK | FINANCE | USER a | FINANCE 3G | 20001115 | ★ |
| 87 | 23 | NEXT DB PROPOSAL PAPER | B INSURANCE | INSURANCE | USER b | INSURANCE 2G | 20001003 | ☐ |
| 83 | 12 | NEW SERVICE | C BANK | INSURANCE | USER c | INSURANCE 1G | 20001001 | ☐ 3320 |

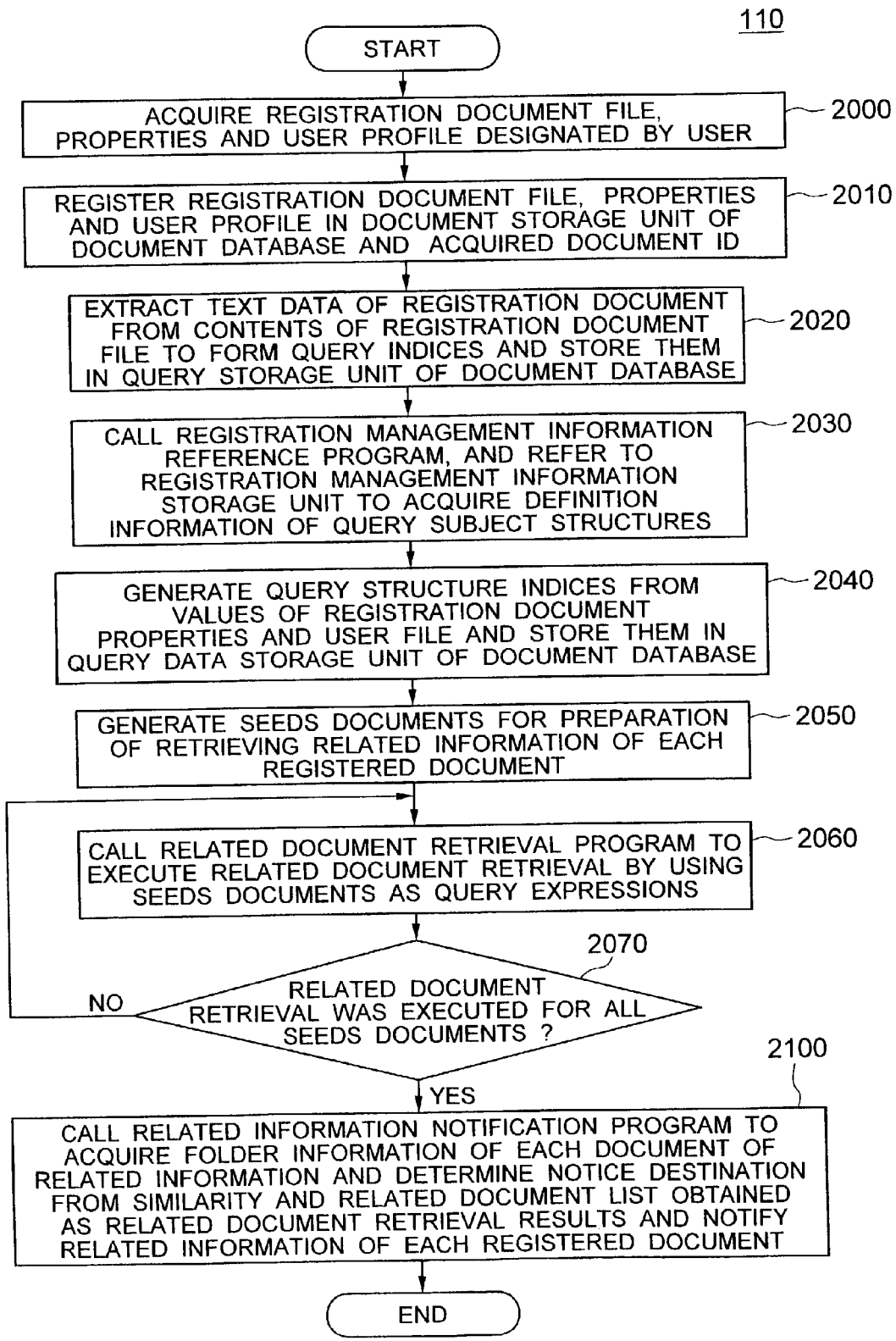

METHOD AND APPARATUS FOR DOCUMENT INFORMATION MANAGEMENT

BACKGROUND OF THE INVENTION

1. Field of the Invention

The present invention relates to a document information management method and apparatus, and more particularly to a document information management method and apparatus capable of sharing document information via a computer network.

2. Description of the Related Art

With the recent spread of computer networks, individuals can supply information directly to anyone. For example, each individual can transmit information to the whole world by using electronic news, electronic mails, WWW and the like. By publicizing individual information, it becomes easy to appeal the characteristics and performance of the individual. Intellectual productivity of a society can be improved by sharing publicized individual performance, information, know-how and knowledge.

Computer networks can be used as infrastructures for information sharing. With the developments in networking, the infrastructures of information sharing have been reorganized progressively. Although reorganization of infrastructures is necessary for information sharing, it does not necessarily result in promotion of information sharing.

Intellectual productivity of the whole group can only be improved by publicizing and sharing the information, knowledge, know-how and the like which have been individually stored and managed by each member of the group to improve the intellectual productivity of each member.

Electronic bulletin boards, Internet home pages and the like are used for information sharing on computer networks. The person who publicized information can know to some extent the response of publicized information from the number of accesses to the publicized information. A conventional information sharing system is, however, associated with the problem that people do not positively register their contents. This is because document registration processes are complicated or registration destination selection is complicated and difficult.

In order to solve this problem, techniques have been proposes as disclosed in JP-A-2000-89991. According to this disclosure, folders are classified into a plurality of hierarchical levels and a user is supplied with services in response to a folder automatic classification request sent from the user. Another approach is disclosed in JP-A-9-311805 which facilitates a work of selecting a file suitable for storing a new document and a work of selecting a folder suitable for searching a document satisfying a desired query expression.

SUMMARY OF THE INVENTION

A conventional information sharing system improves its usability by providing information registration environments simple and easy to use. However, the conventional information sharing system cannot supply an information provider with a positive incentive to provide and share information.

It is an object of the present invention to provide a document information management method allowing a user who publicized and registered a document to obtain know-how of useful related information in order to efficiently progress information/knowledge sharing.

In order to achieve the above object, in a document information management method for a document information management system having a document management server storing a plurality of documents and terminals interconnected by a network, the following steps are performed.

In response to a document registration request from a terminal, the document management server compares the contents of a document to be registered with the contents of an already registered document, and notifies related information of the already registered document having similar contents to a terminal of a registrant of the already registered document.

In response to a document registration request from a terminal, the document management server compares bibliographical information of a document to be registered with bibliographical information of an already registered document, and notifies related information of the already registered document having similar bibliographical information to a terminal of a registrant of the already registered document.

In response to a document registration request from a terminal, the document management server compares a user profile of a registrant of a document to be registered with a user profile of a registrant of an already registered document, and notifies related information of the already registered document having a similar user profile to a terminal of a registrant of the already registered document.

In response to a document registration request from a terminal by designating one folder from a plurality of folders, the document management server compares the contents of a document to be registered with the contents of an already registered document in the designated folder, and notifies related information of the already registered document having similar contents in the designated folder to a terminal of a registrant of the already registered document.

In a document information management method for a document management server storing a plurality of documents and having terminals interconnected by a network, the following steps are performed.

In response to a document registration request from a terminal, the document management server compares the contents of a document to be registered with the contents of an already registered document, and notifies related information of the already registered document having similar contents to a terminal of a registrant of the already registered document.

The related information is a document name of the document to be registered, or it is a document name of the document to be registered, a registrant name, and a user profile of a registrant.

In a document information management system having a document management server storing a plurality of documents and terminals interconnected by a network, the document management server comprises means responsive to a document registration request from a terminal, for comparing the contents of a document to be registered with the contents of an already registered document, and means for notifying related information of the already registered document having similar contents to a terminal of a registrant of the already registered document.

Other objects, features and advantages of the invention will become apparent from the following description of the embodiments of the invention taken in conjunction with the accompanying drawings.

BRIEF DESCRIPTION OF THE DRAWINGS

FIG. 4 is a diagram showing an example of a user profile to be used by the document management system of the first embodiment.

FIG. 5 is a diagram showing an example of the structure of an organization to be used by the document management system of the first embodiment.

FIG. 7 is a diagram showing an example of a related information display window for supplying information of a registered document having similar contents, the window being used by the document information management system of the first embodiment.

FIG. 8 is a diagram showing an example of a mail for supplying related information of a registered document having similar document properties, the mail being used by the document information management system of the first embodiment.

FIG. 9 is a diagram showing an example of a related information display window for supplying information of a registered document having similar document properties, the window being used by the document information management system of the first embodiment.

FIG. 11 is a diagram showing an example of a related information display window for supplying information of a registered document having a similar user profile, the window being used by the document information management system of the first embodiment.

FIG. 12 is a flow chart illustrating the operation of a document registration process to be executed by the document management system of the first embodiment.

FIG. 14 is a diagram showing an example of a related information display window for supplying information of a registered document having similar contents, the window being used by the document information management system of the second embodiment.

FIG. 15 is a flow chart illustrating the operation of a document registration process to be executed by the document management system of the second embodiment.

DESCRIPTION OF THE EMBODIMENTS

First Embodiment

The first embodiment of the invention will be described with reference to the accompanying drawings.

Figure 1:
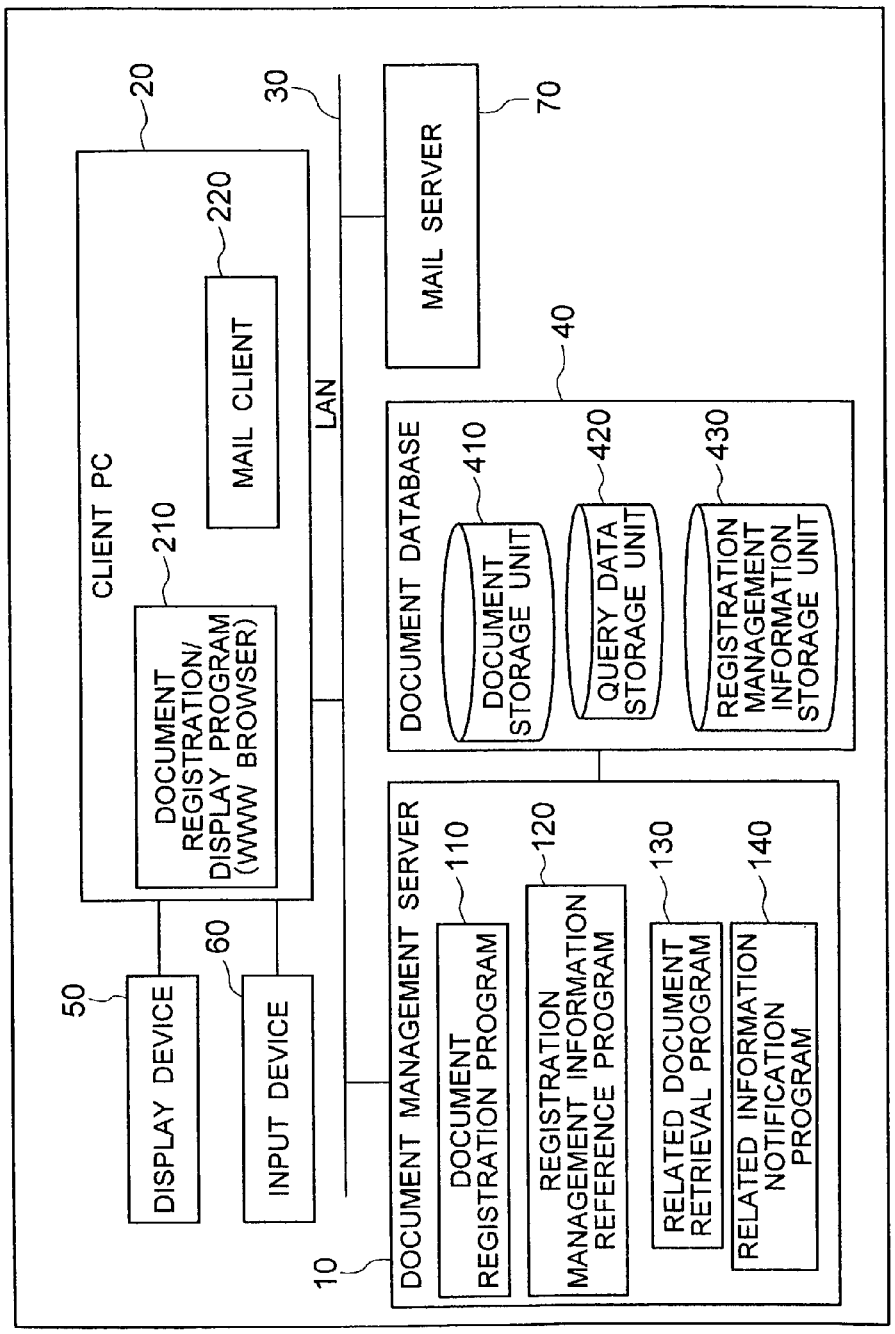
FIG. 1 is a block diagram showing the whole structure of a document management system according to a first embodiment.

FIG. 1 is a block diagram showing the structure of a document management system of the first embodiment. The document management system shown in FIG. 1 has a document management server 10, a client PC 20 as a terminal, and a mail server 70, respectively interconnected by a network 30 such as a LAN, the Internet and public telephone lines.

The document management server 10 has a document database 40, a document registration program 110 for controlling the document database 40, a registration management information reference program 120, a similar document retrieval program 130 and a related information notification program 140.

In this embodiment, the client PC 20 has a document registration/display program 210, a mail client 220, a display device 50 and an input device 60. The document registration/display program 210 can be utilized by a WWW browser and transfers information and data to and from each program in the document management server.

The document database 40 has a document storage unit 410, a query data storage unit 420 and a registration management information storage unit 430. Document or text data is stored in the document storage unit 410, query indices and query structure indices are stored in the query data storage unit 420, and definition information of query subject structures is stored in the registration management information storage unit 430.

In the document management system of this embodiment, designation of a query subject structure is added to a query expression in order to search a similar document and acquire related information of a registered document. This can be realized by utilizing the similar document search technique of searching a structured document similar to a seeds document, this technique being disclosed in JP-A-2001-14326.

In the document management system of this embodiment, a user performs a process of registering a document in the document database 40 by involving the document registration/display program 210. A user such as a person belonging to one organization uses the document management system to register a document. A user activates the document registration/display program 210 by using the client PC 20, designates a registration document file and enters registration document property values by using the input device 60. The registration document properties are bibliographical information or attributes of the document to be registered.

The document registration program 110 operates to store the registration document file, properties and user profile entered from the client PC 20 by using the document registration/display program 210 into the document storage unit 410 of the document database 40. The user profile is attribute information for identifying the user, such as an organization to which the user belongs, a work under the charge of the user, a user mail address and the like. The document registration program 110 operates to generate query data in accordance with the registration document file, properties and user profile, to store the query data in the query data storage unit 420 of the document database 40, and to set seeds documents which are used as query expressions of searching a similar document in accordance with the registration document file, properties and user profile.

The registration management information reference program 120 operates to read definition information of query subject structures from the registration information storage unit 430 and pass it to the document registration program 110.

The related document retrieval program 130 searches data stored in the document database 40 by using as a query expression the seeds document set by the document registration program 110. The related information notification program 140 determines a notice destination in accordance with the query results obtained by the related document retrieval program 130, creates a mail which contains related information of a registered document, and transmits it to the notice destination.

The mail client 220 acquires mail data in the mail server 70 via the network 30 and displays it. The document registration/display program 210 displays the mail data and related information of a registered document appended to the mail data on the display device 50.

Next, the outline of processes to be executed by the document management system of the embodiment will be described specifically.

Figure 2:
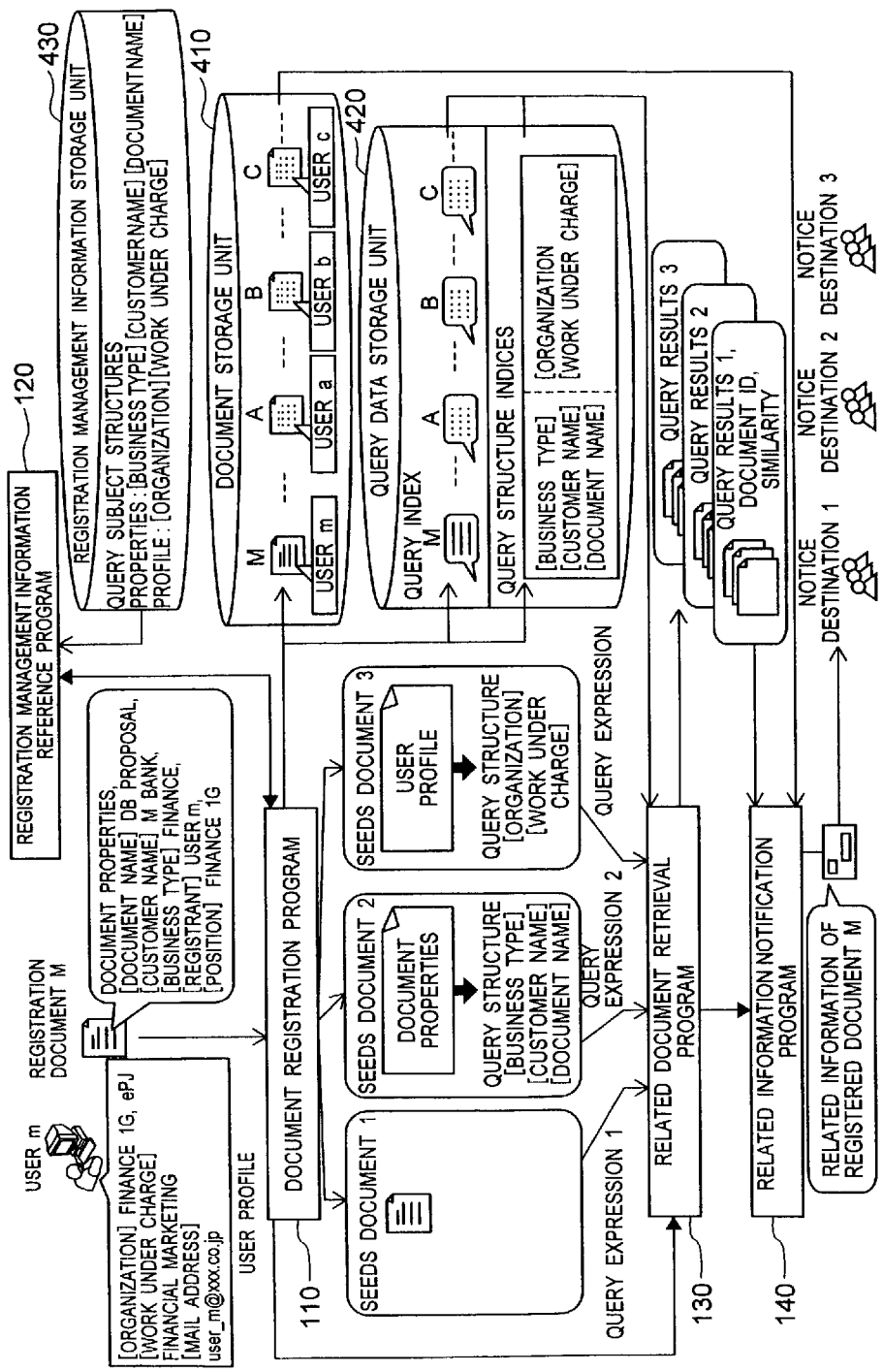
FIG. 2 is a diagram illustrating the outline of processes to be executed by the document management system according to the first embodiment.

FIG. 2 is a diagram illustrating the outline of processes to be executed by the document management system of the embodiment. As shown in FIG. 2, a user m designates the file of a registration document M created by the user m by using the document registration display program 210 and enters property values. In response to this, the document registration program 110 is called to execute a registration process so that the registration document is stored in the document storage unit 410. In FIG. 2, documents M, A, B, C, . . . are shown stored.

Figure 3:
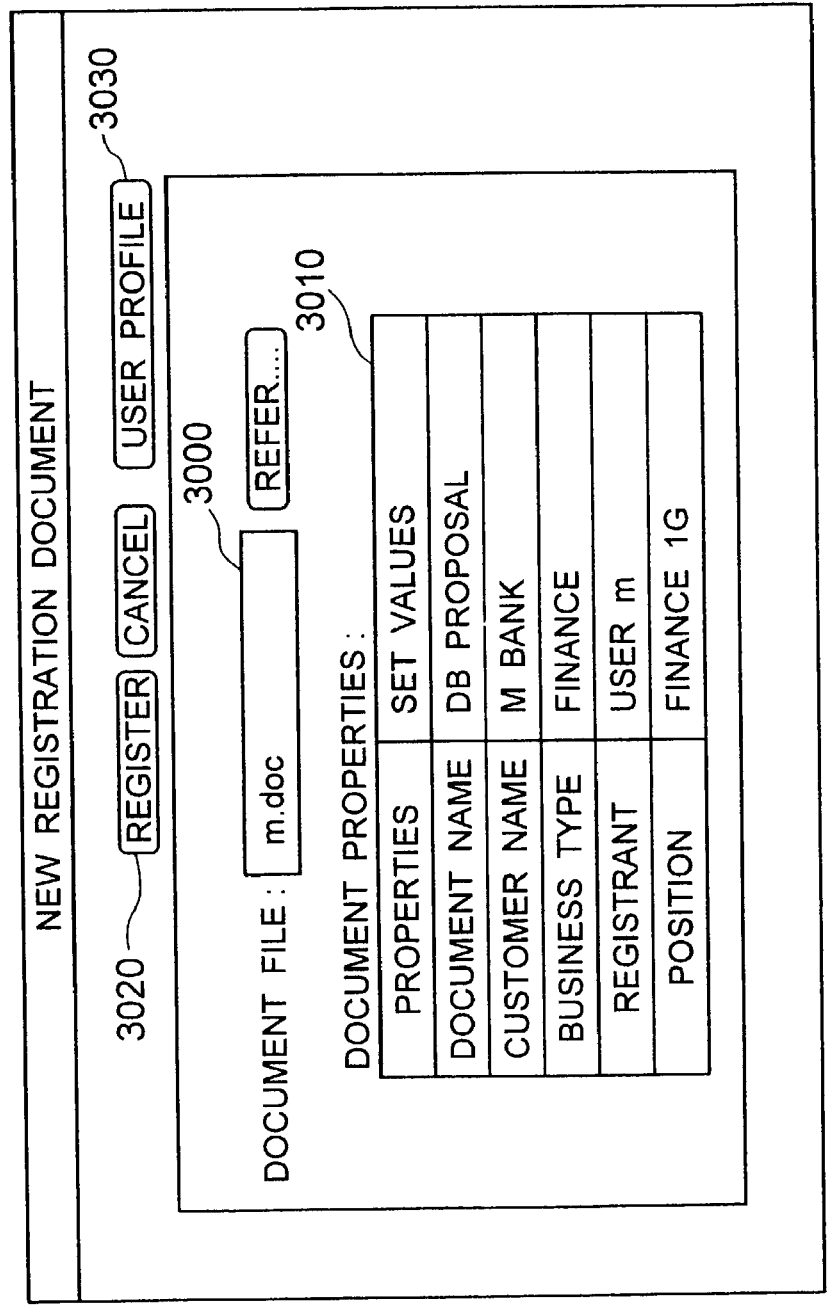
FIG. 3 is a diagram showing an example of a new document registration window to be used by the document management system of the first embodiment.

An example of a new document registration window displayed by the document registration/display program 210 is shown in FIG. 3. The new document registration window contains items of a document file 3000 and document properties 3010. The document file 3000 can be designated by directly entering a file name "m.doc" or selecting a file name from a file name list displayed by clicking a reference button. The document properties 3010 are input by entering "DB proposal" as the document name, "M bank" as the customer name, and so on. Lastly, a registration button 3020 is clicked to start the registration process. If a user profile button 3030 is clicked, the user profile is displayed so that the profile can be checked or altered.

The document registration program 110 shown in FIG. 2 generates query indices M in accordance with the contents of the registration document M file, and stores them in the query data storage unit 420. FIG. 2 shows that query indices M, A, B, C, . . . are stored in the query data storage unit 420. The document query indices are, for example, a set of words extracted from the document.

Next, the document registration program 110 calls the registration management information reference program 120 to read the definition information of query subject structures from the registration management information storage unit 430. The definition information of query subject structures defines the structure of each query subject to be extracted from related information of the document properties and user profile.

In the example shown in FIG. 2, structures "business type", "customer name" and "document name" are used for extracting values from the document properties, and structures "organization" and "work under charge" are used for extracting values from the user profile.

In accordance with the definition information of query subject structures and in accordance with values of "business type", "customer name" and "document name" of the document properties and values of "organization" and "work under charge" of the user profile, the document registration program 110 creates query structure indices and stores them in the query data storage unit 420. The query data storage unit 420 stores the query structure indices of all registered documents.

Next, in accordance with the registration document M file, document properties and user profile, the document registration program 110 sets the following three query expressions to seeds documents for the preparation of retrieving related or similar documents. First, the contents of the registration document M file are set to a seeds document which is used as a query expression 1. Next, the values "finance", "m [band] bank" and "DB proposal" respectively of the structures "business type", "customer name" and "document name" of the document properties of the registration document M are set to a seed document which is used as a query expression 2. Next, the values "finance 1G ePJ" and "financial marketing" respectively of the structures "organization" and "work under charge" of the user profile of the registrant m are set to a seeds document which is used as a query expression 3.

An example of the user profile is shown in FIG. 4. The user profile is constituted of a user ID, an organization, a work under charge and a mail address. For example, the user having a user ID "a" belongs to the organization "finance 3G", and has "finance marketing" as the work under charge and "user_a@xxx.co.jp" as the mail address. The user having the user ID "m" shown in FIG. 2 belongs to the organization "finance 1G, ePJ". This means that as shown in the organization configuration map of FIG. 5, the user m belongs to two organizations, group "finance 1G and project "ePJ".

Next, the document registration program 110 calls the related document retrieval program 130 to execute related document retrieval. As the related document retrieval results by the query expression 1, the document ID and similarity of each related document are obtained. Similarly, as the related document retrieval results by the query expression 2, the document ID and similarity of each related document are obtained. As the related document retrieval results by the query expression 3, the document ID and similarity of each related document are obtained.

The related document retrieval program 130 first retrieves each related document by using the query expression 1 and uses the retrieval result as a retrieval result 1. Next, the program 130 designates the "business type", "customer name" and "document name" as the query subject structures for the query expression 2 and uses the retrieval result as a retrieval result 2. The program 130 further designates the "organization" and "work under charge" as the query subject structures for the query expression 3 and uses the retrieval result as a retrieval result 3.

In accordance with the retrieval results obtained by the related document retrieval program 130, the related information notification program 140 sorts the retrieval results in the higher order of similarity to the registered document (in this embodiment, the registered document is also listed), and creates a related information list (refer to FIG. 7 and the like) for each notice destination user, the list including items such as similarity, document ID and document name. The registration document properties and user profile along with an appended file "related information.htm" are transmitted to each user by a mail.

Figure 6:
FIG. 6 is a diagram showing an example of a mail for supplying related information of a registered document having similar contents, the mail being used by the document information management system of the first embodiment.

The outline of a notice mail to be transmitted by the related information notification program 140 of the embodiment will be described. An example of the mail for notifying the related information of each registered document having similar contents is shown in FIG. 6. FIG. 6 illustratively shows the contents of the mail notifying the user a of the related information after the new document is registered as illustrated in FIG. 3.

The user a activates the mail client 220 to display the mail. The user can know from this mail that the document having similar contents to the document already publicized and registered by the user a was newly registered by the user m, and also the user can know the outline of the registered document and registrant user profile, and a contents similarity. When the appended file "related information.htm" 6010 is clicked by the user, the document registration/display program 210 displays the detailed related information.

Next, the display method by the document registration/display program 210 of the embodiment will be described briefly. An example of a detailed related information display window to be displayed by the document registration/display program 210 is shown in FIG. 7.

The window shown in FIG. 7 is displayed when the user a clicks the appended file "related information.htm" in the received mail display window shown in FIG. 6. The related information display window shown in FIG. 7 is constituted of the display contents of the related information mail shown in FIG. 6 and detailed related information 3100.

The related information 3100 has display items including a similarity, a document ID, a document name, a customer name, a business type, and a registration date. Documents are listed in the higher similarity order. In the entry having the similarity of 100, the customer name "M bank" is the name of the customer to which the user m supplies the document having the document name "DB proposal", the business type "finance" is the business of the customer, the position "finance 1G" is the position of the user m, and the registration date "20001225" is the date when the document was registered in the document management system.

As the user clicks the document name of a desired document, a proper application (such as Word and Excel) is activated to allow the user to refer to the document. As the user clicks a desired registrant in the related information, the user profile of the registrant can be referred to.

In the example shown in FIG. 7, the newly registered document itself is displayed at the top as having the similarity of 100, and other documents having similarities of 95, 87 and 83 are listed in this order. Since a user icon 3101 is displayed on the document of the user a, the relation to other documents can be known easily.

The user a notified of the related information can know that the newly registered user m is in charge of customers having the same business type. It is also possible to know that users b and c in charge of customers having different business types registered similar proposals. In accordance with this information, the user a can communicate with the other users b and c. As a result, the user can share know-how such as common technical information and issues, and customer needs whatever the business type is.

An example of the mail for notifying the related information of each registered document having similar document properties is shown in FIG. 8. FIG. 8 illustratively shows the contents of the mail notifying the user d of the related information after the new document is registered as illustrated in FIG. 3.

The user d activates the mail client 220 to display the mail. The user can know from this mail that the document having similar document properties to the document already publicized and registered by the user d was newly registered by the user m, and also the user can know the outline of the registered document and registrant user profile, and a properties similarity.

The detailed related information window shown in FIG. 9 is displayed when the user d clicks the appended file "related information.htm" 8010 in the received main display window shown in FIG. 8. The related information display window shown in FIG. 9 is constituted of the display contents of the related information mail shown in FIG. 8 and detailed related information 3110. The related information 3110 is similar to that shown in FIG. 7, and the description thereof is omitted.

In the example shown in FIG. 9, the newly registered document itself is displayed at the top as having the similarity of 100, and other documents having similarities of 65, 43 and 30 are listed in this order.

The user d notified of the related information can know that the newly registered user m is in charge of customers having the same business type. It is also possible to know that users b and e in charge of customers having different business types registered document having similar document properties. In accordance with this information, the user d can communicate with the other users b and e. As a result, the user can share know-how such as various customer needs and case information.

Figure 10:
FIG. 10 is a diagram showing an example of a mail for supplying related information of a registered document having a similar user profile, the mail being used by the document information management system of the first embodiment.

An example of the mail for notifying the related information of each registered document having similar user profile is shown in FIG. 10. FIG. 10 illustratively shows the contents of the mail notifying the user f of the related information after the new document is registered as illustrated in FIG. 3.

The user f activates the mail client 220 to display the mail. The user can know from this mail that the document having a similar user profile to the document already publicized and registered by the user f was newly registered by the user m, and also the user can know the outline of the registered document and registrant user profile, and a user profile similarity.

The detailed related information window shown in FIG. 11 is displayed when the user f clicks the appended file "related information.htm" in the received main display window shown in FIG. 10. The related information display window shown in FIG. 10 is constituted of the display contents of the related information mail shown in FIG. 10 and detailed related information 3120. The related information 3120 is constituted of display items including a similarity, a document ID, a document name, a registrant, an organization, a work under charge, and a mail address. The documents are listed in the higher similarity order.

As the user clicks the document name of a desired document in the related information, a proper application is activated to allow the user to refer to the document contents. As the user clicks a desired document ID in the related information, the user can refer to the document properties.

In the example shown in FIG. 11, the newly registered document itself is displayed at the top as having the similarity of 100, and other documents having similarities of 70, 62 and 40 are listed in this order.

Since a user icon 3121 is displayed on the document of the user f, the relation to other documents can be known easily.

The user f notified of the related information can know that the user m belonging to the same organization registered the new proposal and that the users d and g having close relation of businesses registered proposals. In accordance with this information, the user f can communicate with such other users d and g. As a result, the user can know the latest status of users belonging to the same organization, and the registration status of users having close relation of businesses even if the organizations are different. It is possible to share know-how such as business progression information.

Next, the specific procedure of a document registration process to be executed by the document registration program 110 of the embodiment will be described with reference to the flow chart of FIG. 12.

Step 2000: Acquire the registration document file, properties and user profile designated by a user.

Step 2010: Register the registration document file, properties and user profile in the document storage unit 410 of the document database 40 and acquire a document ID.

Step 2020: Extract text data of the registration document from the contents of the registration document file to form query indices and store then in the query data storage unit 420 of the document database 40.

Step 2030: Call the registration management information reference program 120, and refer to the registration management information storage unit 430 to acquire the definition information of query subject structures.

Step 2040: Generate query structure indices from the values of the registration document properties and user profile and store them in the query data storage unit 420 of the document database 40.

Step 2050: generate seeds documents for the preparation of retrieving related information of each registered document.

Step 2060: Call the related document retrieval program 130 to execute related document retrieval by using the seeds documents as query expressions.

Step 2070: Judge whether the related document retrieval for all seeds documents is completed. If the judgement is YES, the flow advances to Step 2080, whereas if NO, the flow returns to Step 2060.

Step 2080: Call the related information notification program 140 to determine a notice destination from the similarity and related document list obtained as the related document retrieval results and notify the related information of each registered document.

As described above, as a user registers a document, a notice destination is supplied with related information as a list of registered documents having similar document contents, properties and user profile. Since a user who publicized and registered information is notified of that similar information was registered, the user can know useful related information with ease and can have an incentive to a positive participation to information/knowledge sharing.

As a user registers a document, a notice destination is supplied with a mail of related information of the contents of the document. Since the user who publicized information is notified of the presence and progress status of a business, person or organization having similar objectives from the viewpoint of similar document contents, the user can grasp the useful related information from the noticed contents.

As a user registers a document, a notice destination is supplied with a displayed mail of related information of the document properties. Since the user who publicized information is notified of the presence and progress status of a business, person or organization having similar objectives from the viewpoint of similar document properties, the user can grasp the useful related information from the noticed contents.

As a user registers a document, a notice destination is supplied with a mail of related information of the user profile. Since the user who publicized information is notified of the latest status of users belonging to the same organization along with the registration status of users having close relation to businesses or of interested users whatever the business type is, the user can grasp the useful related information with ease from the noticed contents.

Since the document having a high similarity can be selected from the related information of each registered document and displayed, the user can efficiently grasp related information useful to the user.

Accordingly, the positive (progressive) factor of a document provider can be accelerated and an incentive to positive participation to information/knowledge sharing is possible. Namely, information sharing is not realized in a simple manner but a positive incentive is given to the information provider so that the information sharing can be enhanced and activated.

Second Embodiment

In the second embodiment, a document is registered by designating a folder, and when related information is displayed and if the document of the related information is being stored in the same folder as the registered document, this fact is explicitly displayed. In this embodiment, therefore, information of the place whether the document of the related information is stored is explicitly displayed.

Registering a document by designating a folder according to the second embodiment will be described with reference to the accompanying drawings.

Figure 13:
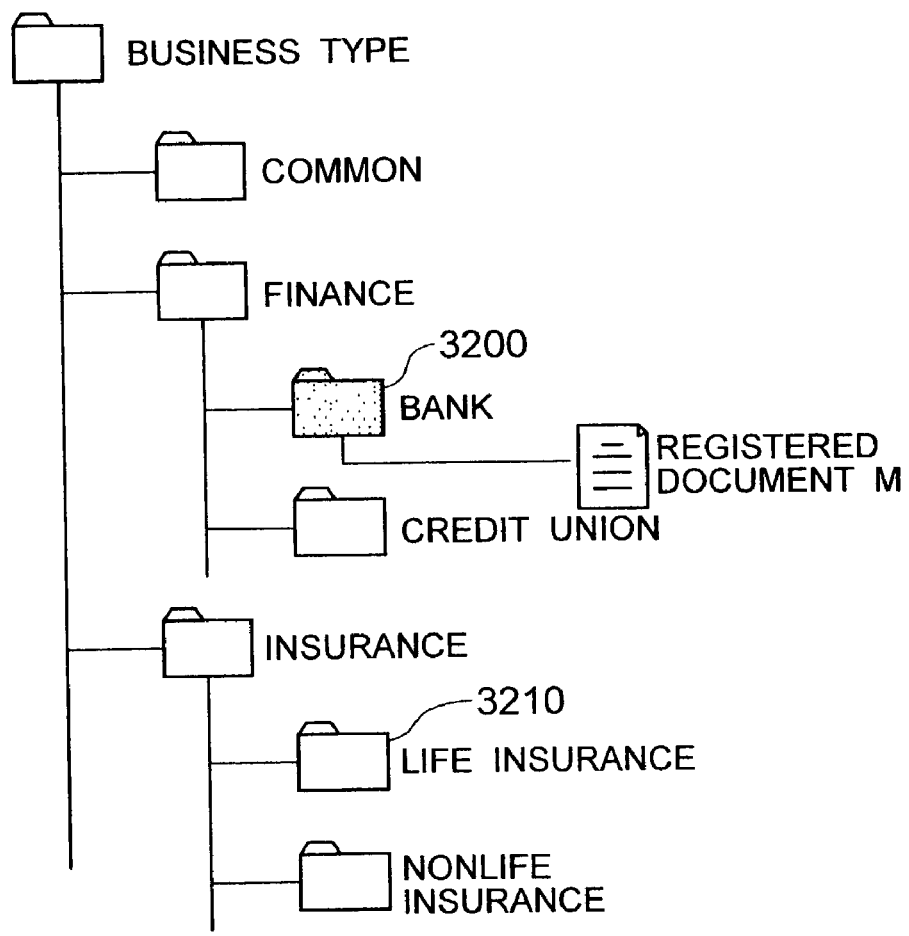
FIG. 13 is a diagram showing an example of a folder structure to be used by a document management system according to a second embodiment.

An example of the folder configuration for registering a document is shown in FIG. 13. The folder configuration shown in FIG. 13 is based upon the viewpoint of business type. The first level folder is "business type", and the second level folders are "common", "finance" and "insurance". For example, when a user registers a document M by designating a "bank" folder 3200 shown in FIG. 13, a related information display window such as shown in FIG. 14 is displayed.

FIG. 14 shows an example of the related information display window displayed when a user a registers a document by designating a folder. In the related information display window shown in FIG. 14, folder information 3300 along with the display contents of the related information display window shown in FIG. 7 is displayed.

In the folder information 3300, a folder icon with an asterisk mark indicates the folder in which the document M "DB proposal" was registered, i.e., the folder "business type/finance/bank", and a folder with an asterisk mark indicates other folders.

In the related information display window shown in FIG. 14, whether each document of related information is being registered in the same folder as that of the registered document M is displayed. If the document of related information is being registered in the same folder as that of the registered document M, a folder icon 3310 is displayed, whereas if it is being registered in a different folder, a folder icon 3320 is displayed.

For example, a document "integrated system" having a document ID 67 is being registered in the same folder as that of the registered document M. A document "next DB proposal paper" having a document ID 23 is being registered in a different folder from that of the registered document M, e.g., in an "insurance" folder 3210 shown in FIG. 13. The folder icon 3320 is therefore displayed.

Next, the document registration process to be executed by the document registration program 110 of this embodiment will be described with reference to the flow chart shown in FIG. 15.

Steps 2000 to 2070 are same as those shown in the flow chart of FIG. 12 excepting that a document is registered at Step 2010 by designating a folder.

Step 2100: Call the related information notification program 140 to acquire folder information of each document of related information and determine a notice destination from the similarity and related document list obtained as the related document retrieval results, and notify the related information of each registered document.

Next, a user operation relative to a folder icon will be described.

As a user clicks the folder icon 3310 or 3320 shown in FIG. 14, a list of documents registered in the folder is displayed. For example, as a user clicks the folder icon 3310 shown in FIG. 14, a list of documents registered in the registration folder "business type/finance/bank" is displayed. A similarity of each document to the registered document is displayed. As a user clicks the folder icon 3320, a list of documents in another folder is displayed. Also in this case, a similarity of each document to the registered document is displayed.

As described above, according to the second embodiment, as a user registers a document by designating a registration folder, related information of documents having similar contents in the registration holder is notified. Since a user who publicized and registered information is notified of that similar information was registered, the user can know useful related information in the registration folder and can have an incentive to a positive participation to information/knowledge sharing.

Since a user can judge whether the registration folder is adequate, the user feels easy and the negative (retractive) factor of information sharing can be eliminated to further progress information sharing.

As a user registers a document by designating a registration folder, related information of documents having similar contents in a holder other than the registration holder is notified. Since a user who publicized and registered information is notified of related information of documents having similar contents in a holder other than the registration holder, the user can refer to registered documents from various viewpoints and can know useful business information.

If a user judges that a folder other than the registration holder is appropriate, the registration folder may be changed. Therefore, the user feels easy and the negative (retractive) factor of information sharing can be eliminated to further progress information sharing.

Third Embodiment

In the third embodiment, when a document is registered, a plurality of folders are designated to register the document in the folders related to each other. When related information is displayed in a window, it is possible to select a desired folder in the window. If the document of related information is being registered in the same folder, the document being registered in the same folder is explicitly displayed.

Registering a document in a plurality of folders related to each other according to the third embodiment will be described with reference to the accompanying drawings.

Figure 16:
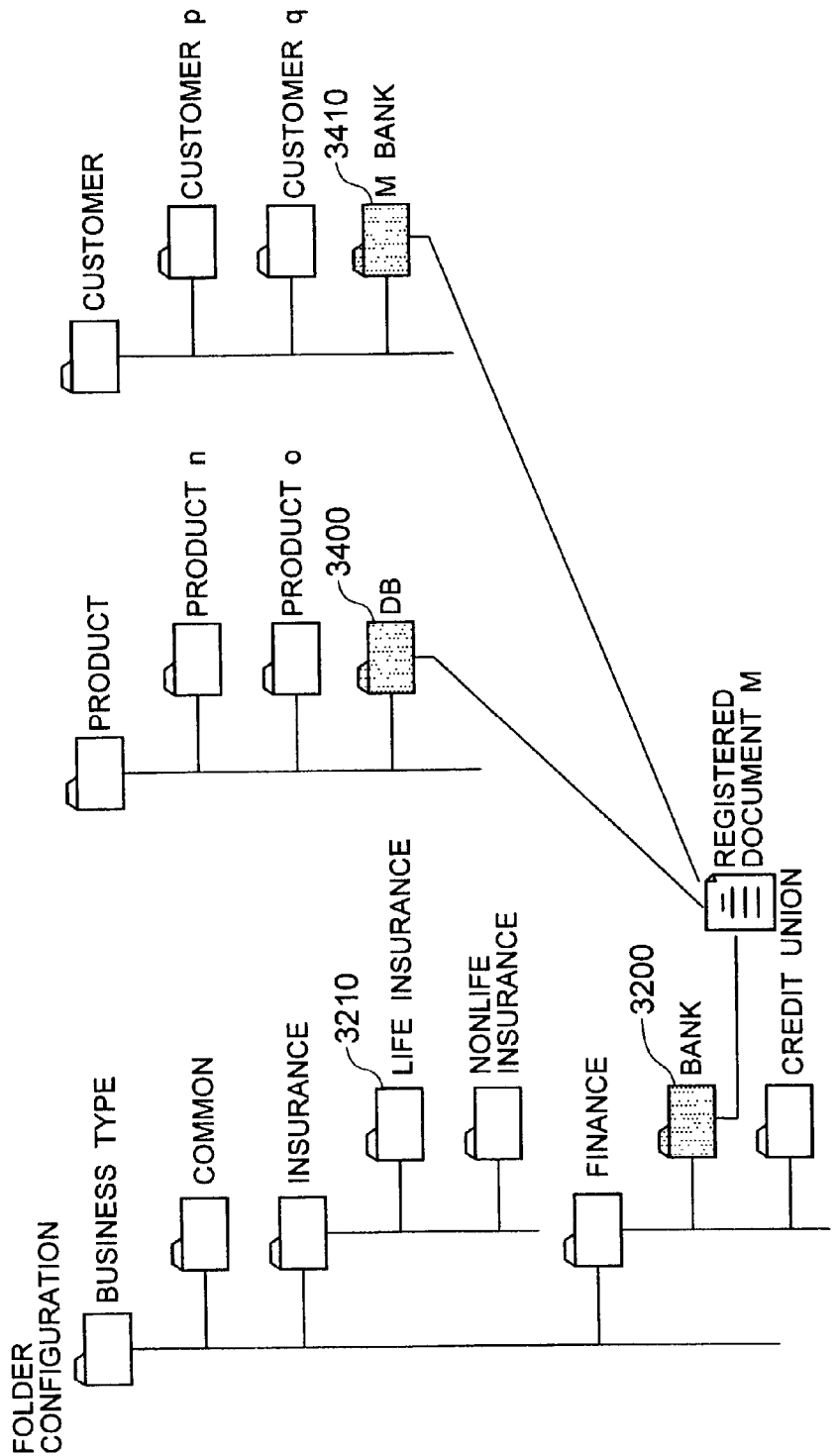
FIG. 16 is a diagram showing an example of the structure of folders in which a document is registered by a document management system according to a third embodiment.

An example of a folder configuration for registering documents is shown in FIG. 16. The folder configuration shown in FIG. 16 is based upon the three viewpoints of business type, product and customer. For example, a user can designate a "bank" folder 3200, a "DB" folder 3400 and an "M bank" folder 3410 shown in FIG. 16 as registration folders.

Figure 17:
FIG. 17 is a diagram showing an example of a related information display window for supplying information of a registered document having similar contents to the document registered in the folders, the window being used by the document information management system of the third embodiment.

After the document is registered, a related information display window such as shown in FIG. 17 is displayed. FIG. 17 shows an example of the related information display window displayed when a user a registers a document by designating a plurality of folders. A window of related information can be selectively displayed by designating the folder on the related information display window shown in FIG. 17.

In selecting a window of related information, a user clicks a list box 3500 of the registration folder shown in FIG. 17. As the list box 3500 is clicked, a list of registration folders is displayed as a menu. For example, in the case of the registration document M, "business type/finance/bank", "product/DB" and "customer/M bank" are displayed as the menu. The user can select a desired folder from these holders. Folder icons 3510 are displayed in accordance with the selected holder.

As described above, according to the third embodiment, as a document is registered by designating a plurality of folders, the user can know not only the related information of documents in the same registration folder but also the related information of documents in other holders. The user can refer to documents registered from various viewpoints and obtain useful business information. Since the user is given an incentive to a positive participation to information/knowledge sharing, the sharing can further be progressed.

The invention may be realized by storing a program for executing a document information management method of this invention in a portable storage medium and reading it in a memory of a computer to execute the program.

According to the invention, a user can publicize information to easily obtain useful related information without much labor.

It should be further understood by those skilled in the art that the foregoing description has been made on embodiments of the invention and that various changes and modifications may be made in the invention without departing from the spirit of the invention and the scope of the appended claims.

What is claimed is:

1. A document information management method for a document information management system storing a plurality of documents with at least their registrant user information and content information as retrieval information, the method comprising the steps of:

in response to a document registration request to register a new document from a user, extracting content information from the new document;

retrieving from the plurality of documents currently stored in said document information management system a subset of documents whose content information have high similarity with said extracted content information of the new document;

identifying the registrants of said retrieved subset of documents; and notifying, that the new document has been registered in the document information management system, to said identified registrants, and wherein said step of retrieving generates a seed document from the new document and compares said seed document with the plurality of documents currently stored in said document information management system to retrieve a document of content information having high similarity.

2. The document information management method according to claim 1, wherein when notifying that the new document has been registered in the document management system to said identified registrants, the notifying information transmitted to said identified registrants includes, at least one of, a document name of the new document, bibliographic information of the new document, a registrant's user profile of the new document, or a link information to refer to the new document.

3. The document information management method according to claim 2, wherein when notifying that the new document has been registered in the document management system to the identified registrants, the notifying information includes information related to one or more already registered documents having a high similarity with the new document.

4. A document information management system storing a plurality of documents with at least their registrant user information and content information as retrieval information, wherein in response to a document registration request to register a new document, extracting content information from the new document, wherein, from the plurality of documents currently stored in said document information management system a subset of documents whose content information have high similarity with said extracted content information of the new document is retrieved, wherein the registrants of said retrieved subset of documents are identified, wherein the identified registrants are notified that the new document has been registered in the document information management system, and wherein said step of retrieving generates a seed document from the new document and compares said seed document with the plurality of documents currently stored in said document information management system to retrieve a document of content information having high similarity.

5. The document information management system according to claim 4, wherein upon notification that the new document has been registered in the document information management system to the notice destinations, the information transmitted to the notice destinations includes, at least one of a document name of the new document, bibliographic information of the new document, a registrant's user profile of the new document, or a link information to refer to the new document.

6. The document information management system according to claim 5, wherein upon notification that the new document has been registered in the document information management system to the identified registrants, the transmitted information includes information related to one or more already registered documents of the retrieved subset of documents having a high similarity with the new document.

7. A computer-readable storage medium for storing thereon a program for performing a document information management method for a document information management system storing a plurality of documents with at least their registrant user information and content information as retrieval information, the method performed by the program being executed by the document information management system and comprising the steps of:

in response to a document registration request to register a new document from a user I, extracting content information from the new document retrieving from the plurality of documents currently stored in said document information management system a subset of documents whose content information have high similarity with said extracted content information of the new document;

identifying the registrants of the retrieved subset of documents;

notifying, that the new document has been registered in the document information management system, to the identified registrants, and wherein said step of retrieving generates a seed document from the new document and compares said seed document with the plurality of documents currently stored in said document information management system to retrieve a document of content information having high similarity.

8. The computer-readable storage medium according to claim 7, wherein when notifying that the newly registered document has been registered in the document information management system to the notice destinations, the notifying information transmitted to the notice destinations includes, at least one of a document name of the new document, bibliographic information of the new document, a registrant's user profile of the new document, or a link information to refer to the new document.

9. The computer-readable storage medium according to claim 8, wherein when notifying that the new document has been registered in the document information management system to the identified registrants, the notifying information includes information related to one or more already registered documents having a high similarity with the new document.

* * * * *